United States Patent
Woo et al.

(10) Patent No.: US 12,315,953 B2
(45) Date of Patent: May 27, 2025

(54) BATTERY PACK AND VEHICLE INCLUDING THE SAME

(71) Applicant: LG ENERGY SOLUTION, LTD., Seoul (KR)

(72) Inventors: Sung-Hoon Woo, Daejeon (KR); Ju-Hwan Shin, Daejeon (KR); Myung-Ki Park, Daejeon (KR); Won-Kyoung Park, Daejeon (KR); Jun-Yeob Seong, Daejeon (KR); Tae-Kyeong Lee, Daejeon (KR); Hyoung-Suk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/832,057

(22) PCT Filed: Jan. 25, 2023

(86) PCT No.: PCT/KR2023/001146
§ 371 (c)(1),
(2) Date: Jul. 22, 2024

(87) PCT Pub. No.: WO2023/146278
PCT Pub. Date: Aug. 3, 2023

(65) Prior Publication Data
US 2024/0421425 A1    Dec. 19, 2024

(30) Foreign Application Priority Data
Jan. 25, 2022  (KR) .................. 10-2022-0011081

(51) Int. Cl.
*H01M 50/211*    (2021.01)
*B60L 50/64*    (2019.01)
(Continued)

(52) U.S. Cl.
CPC ........... *H01M 50/383* (2021.01); *B60L 50/64* (2019.02); *H01M 50/211* (2021.01);
(Continued)

(58) Field of Classification Search
None
See application file for complete search history.

(56) References Cited

U.S. PATENT DOCUMENTS

| | | | |
|---|---|---|---|
| 11,316,230 B1 * | 4/2022 | Boecker | H01M 10/6556 |
| 2016/0218333 A1 * | 7/2016 | Takasaki | H01M 50/367 |

(Continued)

FOREIGN PATENT DOCUMENTS

| | | | |
|---|---|---|---|
| CN | 109686891 A | | 4/2019 |
| CN | 110444835 | * | 11/2019 |

(Continued)

OTHER PUBLICATIONS

International Search Report for PCT/KR2023/001146 mailed on May 16, 2023.
(Continued)

*Primary Examiner* — Lisa S Park
(74) *Attorney, Agent, or Firm* — Birch, Stewart, Kolasch & Birch, LLP

(57) ABSTRACT

A battery pack is configured to discharge a high-temperature gas to the outside of the battery pack without affecting other adjacent battery modules when the gas is generated inside the battery module. The battery pack includes a pack housing; battery modules; and a first side venting channel and a second side venting channel configured to guide a venting gas generated from the battery modules to a collection space at a position corresponding to the battery module, and the pack cover includes a protrusion on a surface of a region corresponding to the collection space.

20 Claims, 16 Drawing Sheets

(51) Int. Cl.
*H01M 50/271* (2021.01)
*H01M 50/289* (2021.01)
*H01M 50/30* (2021.01)
*H01M 50/358* (2021.01)
*H01M 50/383* (2021.01)

(52) U.S. Cl.
CPC ....... *H01M 50/271* (2021.01); *H01M 50/289* (2021.01); *H01M 50/358* (2021.01); *H01M 50/394* (2021.01); *H01M 2220/20* (2013.01)

(56) References Cited

U.S. PATENT DOCUMENTS

| | | | |
|---|---|---|---|
| 2020/0152941 A1 | 5/2020 | Wynn et al. | |
| 2020/0212384 A1 | 7/2020 | Baumann et al. | |
| 2021/0066690 A1* | 3/2021 | Gondoh | H01M 50/367 |
| 2022/0077539 A1 | 3/2022 | Ren et al. | |
| 2022/0209332 A1* | 6/2022 | Jung | H01M 50/249 |
| 2023/0344070 A1* | 10/2023 | Kojc | H01M 10/6556 |

FOREIGN PATENT DOCUMENTS

| | | | |
|---|---|---|---|
| CN | 110444835 A | | 11/2019 |
| CN | 110739424 A | | 1/2020 |
| CN | 210576235 U | | 5/2020 |
| CN | 112670634 A | | 4/2021 |
| DE | 102017212223 | * | 1/2017 |
| JP | 2011-204577 A | | 10/2011 |
| JP | 2016-122543 A | | 7/2016 |
| JP | 2019-102421 A | | 6/2019 |
| KR | 10-1799238 B1 | | 11/2017 |
| KR | 10-2021-0108451 A | | 9/2021 |
| KR | 10-2021-0129512 A | | 10/2021 |
| KR | 10-2021-0130443 A | | 11/2021 |
| WO | WO 2020/039626 A1 | | 2/2020 |

OTHER PUBLICATIONS

Written Opinion of the International Searching Authority for PCT/KR2023/001146 mailed on May 16, 2023.
Extended European Search Report for European Application No. 23747319.4, dated Jan. 30, 2025.

* cited by examiner

BATTERY PACK AND VEHICLE INCLUDING THE SAME

TECHNICAL FIELD

The present disclosure relates to a battery pack and a vehicle including the same, and more specifically, to a battery pack configured to discharge a high-temperature gas to the outside of the battery pack without affecting other adjacent battery modules when the gas is generated inside the battery module, and a vehicle including the same.

The present application claims priority to Korean Patent Application No. 10-2022-0011081 filed on Jan. 25, 2022 in the Republic of Korea, the disclosures of which are incorporated herein by reference.

BACKGROUND ART

As the demand for portable electronic products such as notebooks, video cameras, and mobile phones rapidly increases and the commercialization of robots and electric vehicles begins in earnest, research on high-performance secondary batteries capable of repeated charging and discharging is being actively conducted.

Currently commercialized secondary batteries include nickel cadmium batteries, nickel hydrogen batteries, nickel zinc batteries, and lithium secondary batteries. Among them, lithium secondary batteries are in the limelight because of their advantages of free charge and discharge, very low self-discharge rate, and high energy density, as the memory effect hardly occurs compared to nickel-based secondary batteries.

These lithium secondary batteries mainly use lithium-based oxide and carbon material as a positive electrode active material and a negative electrode active material, respectively. A lithium secondary battery includes an electrode assembly in which a positive electrode plate and a negative electrode plate coated with such a positive electrode active material and a negative electrode active material, respectively, are disposed with a separator therebetween, and an exterior material, that is, a battery case for sealing and accommodating the electrode assembly together with electrolyte.

In general, lithium secondary batteries may be classified into a can-type secondary battery in which an electrode assembly is embedded in a metal can and a pouch-type secondary battery in which an electrode assembly is embedded in a pouch of an aluminum laminate sheet, depending on the shape of the exterior material.

Recently, secondary batteries have been widely used for driving or energy storage not only in small devices such as portable electronic devices, but also in medium and large-sized devices such as electric vehicles and energy storage systems (ESSs). Many of these secondary batteries may be accommodated together inside a module case in a state of being electrically connected, which may configure one battery module, and such battery modules may be electrically connected again in a narrow space to increase energy density, which configures a battery pack.

However, when a plurality of battery modules exist in a dense state in a narrow space as above, they may be vulnerable to accidents such as fire or explosion. For example, when an event such as thermal runaway occurs in one battery module, high-temperature gas may be discharged from the battery module. If this gas is not properly discharged to the outside of the battery pack, the thermal event generated in some battery modules may be propagated to other battery modules provided inside the battery pack, which may cause a chain reaction. Also, in this case, the pressure inside the battery pack increases, and there is a possibility of explosion. When the battery pack explodes, not only great damage may be caused to nearby devices or users due to the pressure of the explosion, but also the range and speed of damage may be further increased. Therefore, it is required to develop a battery pack having a structure that allows the high-temperature gas to be safely discharged to the outside of the battery pack without affecting other adjacent battery modules when an abnormality occurs in some battery modules and a gas is discharged.

DISCLOSURE

Technical Problem

The present disclosure is designed to solve the problems of the related art, and therefore the present disclosure is directed to controlling the flow of a venting gas in a desired direction by adding an additional venting channel formation structure to an existing battery pack.

In another aspect, the present disclosure is directed to allowing the high-temperature venting gas ejected when a thermal event occurs in some battery modules to be safely discharged to the outside of the battery pack without affecting other battery modules inside the battery pack.

However, the technical problem to be solved by the present disclosure is not limited to the above-mentioned problems, and other problems not mentioned will be clearly understood by those skilled in the art from the description below.

Technical Solution

In one aspect of the present disclosure, there is provided a battery pack comprising: a pack housing having a first accommodation space, a second accommodation space spaced apart from the first accommodation space, and a collection space; a first battery module group including a plurality of battery modules disposed within the first accommodation space; a second battery module group including a plurality of battery modules disposed within the second accommodation space; and a pack cover including a first side venting channel configured to guide a venting gas generated in the plurality of battery modules included in the first battery module group to the collection space and a second side venting channel configured to guide a venting gas generated in the plurality of battery modules included in the second battery module group to the collection space, wherein the pack cover includes a protrusion unit on a surface of a region corresponding to the collection space.

The protrusion unit may include a plurality of protrusions configured to protrude from the surface toward the collection space.

The plurality of protrusions may be spaced apart from each other.

The plurality of protrusions may be provided along an extension direction of the collection space The plurality of protrusions may be provided along a direction perpendicular to an extension direction of the collection space.

The plurality of protrusions may be provided in a region adjacent to a boundary between the first accommodation space and the collection space and a region adjacent to a boundary between the second accommodation space and the collection space.

The first battery module group may include a first battery module and a second battery module adjacent to each other, and the second battery module group includes a third battery module and a fourth battery module adjacent to each other.

The battery pack may include a first barrier disposed between the first battery module and the second battery module and between the third battery module and the fourth battery module.

The first barrier may be configured to block the movement of a venting gas between an accommodation space of the first battery module and an accommodation space of the second battery module and the movement of a venting gas between an accommodation space of the third battery module and an accommodation space of the fourth battery module.

The battery pack may include a sealing member between the first barrier and the pack cover and between the first barrier and the pack housing.

The collection space may include a first collection space formed between the first accommodation space and the second accommodation space.

The collection space may include a second collection space formed at a side opposite to the first collection space with the first accommodation space interposed therebetween; and a third collection space formed at a side opposite to the first collection space with the second accommodation space interposed therebetween.

The protrusion unit may be provided in at least one region among a region corresponding to the first collection space, a region corresponding to the second collection space, and a region corresponding to the third collection space.

The pack cover may be configured to guide a venting gas generated in the first battery module to the first collection space and guide a venting gas generated in the second battery module to the second collection space, and guide a venting gas generated in the third battery module to the first collection space and guide a venting gas generated in the fourth battery module to the third collection space.

The first battery module and the third battery module may face each other, and the second battery module and the fourth battery module may face each other.

The battery pack may include a second barrier between an accommodation space accommodating the first battery module and the second collection space, between an accommodation space accommodating the second battery module and the first collection space, between an accommodation space accommodating the third battery module and the third collection space, and between an accommodation space accommodating the fourth battery module and the first collection space.

The first battery module and the fourth battery module may face each other, and the second battery module and the third battery module may face each other.

The battery pack may include a second barrier between an accommodation space accommodating the first battery module and the second collection space, between an accommodation space accommodating the second battery module and the first collection space, between an accommodation space accommodating the third battery module and the first collection space, and between an accommodation space accommodating the fourth battery module and the third collection space.

The pack housing may have a gas collection space formed in a first side.

The pack housing may include a venting device configured to allow the venting gas in the gas collection space to be discharged to the outside of the pack housing.

A vehicle according to an embodiment of the present disclosure for achieving the above object includes the battery pack according to the present disclosure.

Advantageous Effects

According to an aspect of the present disclosure, a function for controlling the flow of a venting gas may be added by creating a venting channel in the pack cover, which is used only for covering the pack housing in general. Specifically, according to this configuration of the present disclosure, when a thermal event occurs in each battery module, flame and venting gas move to the collection space along the first side venting channel and the second side venting channel formed between the upper portion of the battery module and the inner surface of the pack cover, thereby significantly reducing the possibility of thermal events spreading toward adjacent battery modules. When the venting gas moves into the collection space, the protrusion unit prevents the venting gas from moving along the shortest straight path. Therefore, the temperature of the venting gas may drop while the venting gas is moving, and even when a flame is generated together with the venting gas, the intensity of the flame may decrease while moving along the venting channel. Accordingly, it is possible to remove or reduce damage that may occur due to the ejection of the high-temperature venting gas and flame to the outside.

According to another aspect of the present disclosure, when the venting gas moves to the collection space through the first side venting channel and the second side venting channel, it directly encounters a plurality of protrusions. Therefore, the moving path of the venting gas can be effectively increased.

According to another aspect of the present disclosure, the accommodation spaces of the first battery modules adjacent to each other and the accommodation spaces of the second battery modules adjacent to each other are structurally isolated from each other by a first barrier. Thus, the venting gas generated in each battery module does not move toward adjacent battery modules, but moves through the first side venting channel and the second side venting channel. The venting gas moved in this way moves again through the collection space. During this movement, the temperature of the venting gas may be lowered and the intensity of the flame may be weakened. If the first barrier has an approximate beam shape with an empty inner space, it is possible to not only improve the stiffness of the battery pack and block the movement of the venting gas between adjacent accommodation spaces, but also reduce the weight of the battery pack.

According to another aspect of the present disclosure, the effect of preventing the venting gas from moving into the gap between the barrier and the pack cover and/or the pack housing may be further improved.

According to another aspect of the present disclosure, when the venting gas moves to the collection space by applying the protrusion unit, it is possible to prevent the venting gas from moving along the shortest straight path. For example, by selectively applying a protrusion unit to the venting channels provided in the pack cover, the venting gas travel distance can be varied for each battery module. Accordingly, the venting gas generated from each battery module can be discharged with a time difference.

According to another aspect of the present disclosure, a plurality of first battery modules adjacent to each other may configure different venting channels. A plurality of second battery modules adjacent to each other may configure different venting channels. Therefore, it is possible to minimize the effect of high-temperature flame and venting gas generated in an adjacent battery module on other battery modules.

According to another aspect of the present disclosure, an effective venting channel can be configured according to the size of a battery pack and the arrangement of battery modules.

According to another aspect of the present disclosure, when a large amount of gas is generated at once to increase the internal pressure of the battery pack, the internal pressure of the battery pack may be quickly reduced through a gas collection space. The gas may be discharged in an intended direction through the venting device, and even if a lot of venting gas is instantaneously generated, the gas may be discharged more rapidly and smoothly by increasing the process capacity or number of venting devices.

However, the technical problem to be solved by the present disclosure is not limited to the above-mentioned problem, and other problems not mentioned will be clearly understood by those skilled in the art from the description of the invention described below.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
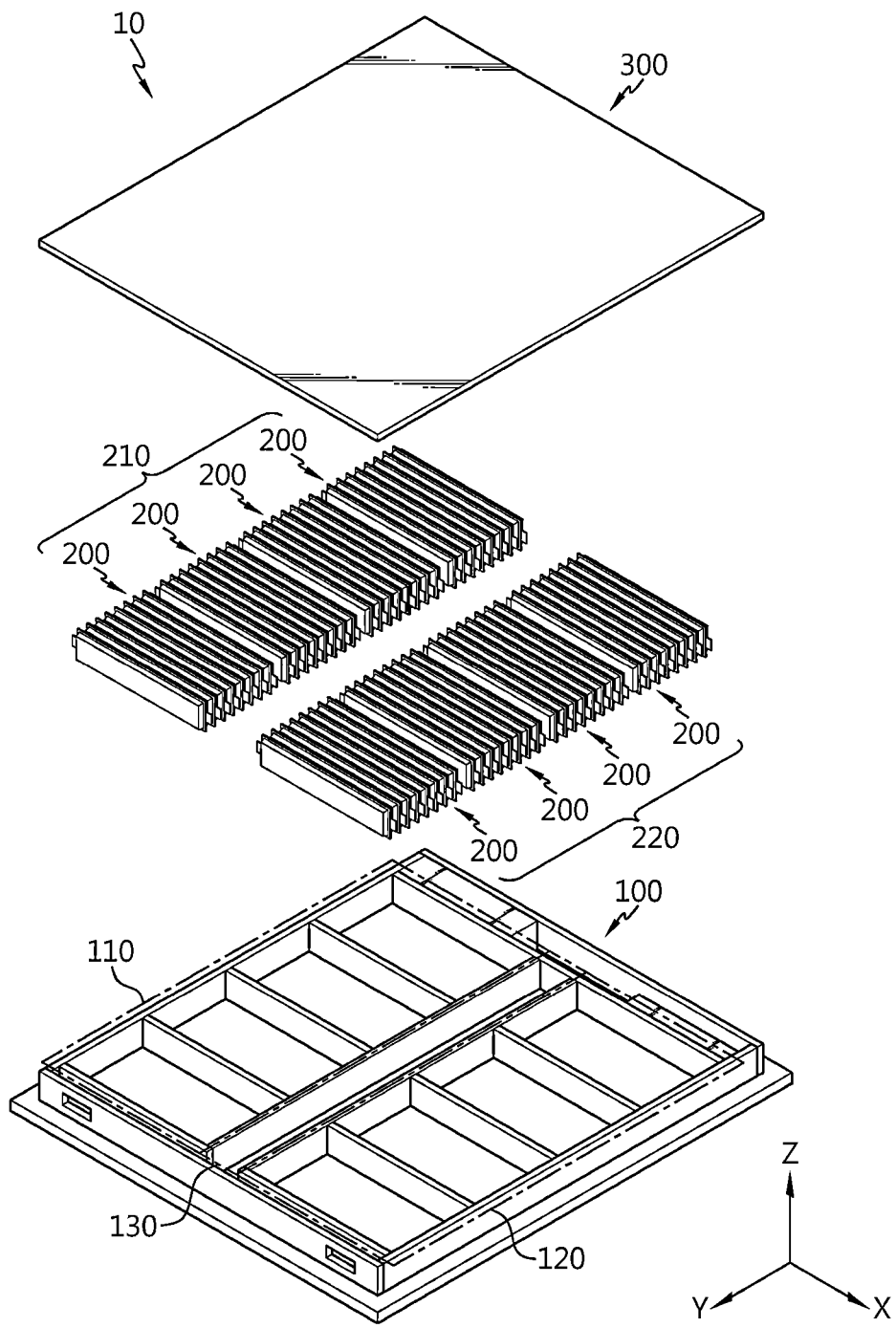
FIG. 1 is an exploded perspective view showing a battery pack according to the present disclosure.

Hereinafter, preferred embodiments of the present disclosure will be described in detail with reference to the accompanying drawings. The accompanying drawings illustrate a preferred embodiment of the present disclosure and together with the foregoing disclosure, serve to provide further understanding of the technical features of the present disclosure, and thus, the present disclosure is not construed as being limited to the drawing. Like reference signs designate like components. Also, in the drawings, the thickness, ratio, and dimensions of components may be exaggerated for effective description of technical content.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In this specification, terms indicating directions such as up, down, left, right, front, and back are used, but these terms are only for convenience of explanation, and it is apparent to those skilled in the art that the terms may vary depending on the location of the target object or the location of the observer.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 2:
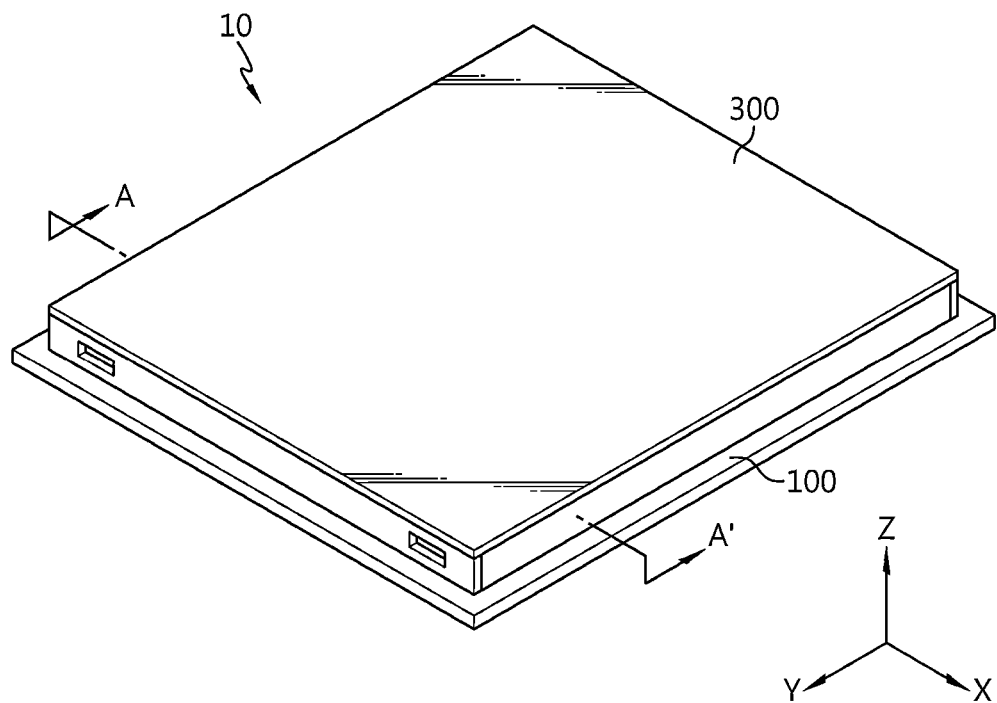
FIG. 2 is a perspective view showing the appearance of a battery pack according to the present disclosure.

FIG. 1 is an exploded perspective view showing a battery pack according to the present disclosure. FIG. 2 is a perspective view showing the appearance of a battery pack according to the present disclosure.

Referring to FIGS. 1 and 2, the battery pack 10 according to the present disclosure includes a pack housing 100, a first battery module group 210, a second battery module group 220, and a pack cover 300.

The pack housing 100 may include a first accommodation space 110, a second accommodation space 120 spaced apart from the first accommodation space 110, and a collection space 130. The first accommodation space 110 and the second accommodation space 120 may be configured to accommodate the battery module 200. The collection space 130 may be configured to collect a venting gas generated from the battery module 200 to be described below. The collection space 130 may be formed between the first accommodation space 110 and the second accommodation space 120. However, in the present disclosure, the collection space 130 is not limited to only the space formed between the first accommodation space 110 and the second accommodation space 120. For example, the collection space 130 may be formed on both sides of the first accommodation space 110 to be described below. Similarly, the collection space 130 may be formed on both sides of the second accommodation space 120, respectively.

The first battery module group 210 may include a plurality of battery modules 200 arranged in the first accommodation space 110. The second battery module group 220 may include a plurality of battery modules 200 disposed in the second accommodation space 120. For example, as shown in FIG. 1, the first battery module group 210 may include four battery modules disposed in the first accommodation space 110, and the second battery module group 220 may include four battery modules disposed in the second accommodation space 120.

Figure 3:
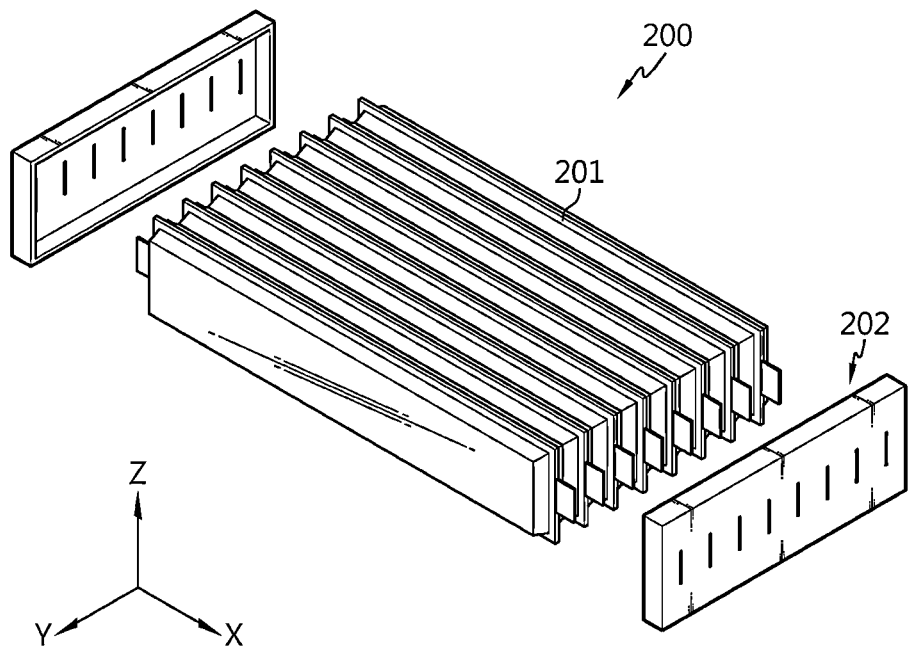
FIGS. 3 and 4 are diagrams showing a battery module included in the battery pack according to the present disclosure.
Figure 4:
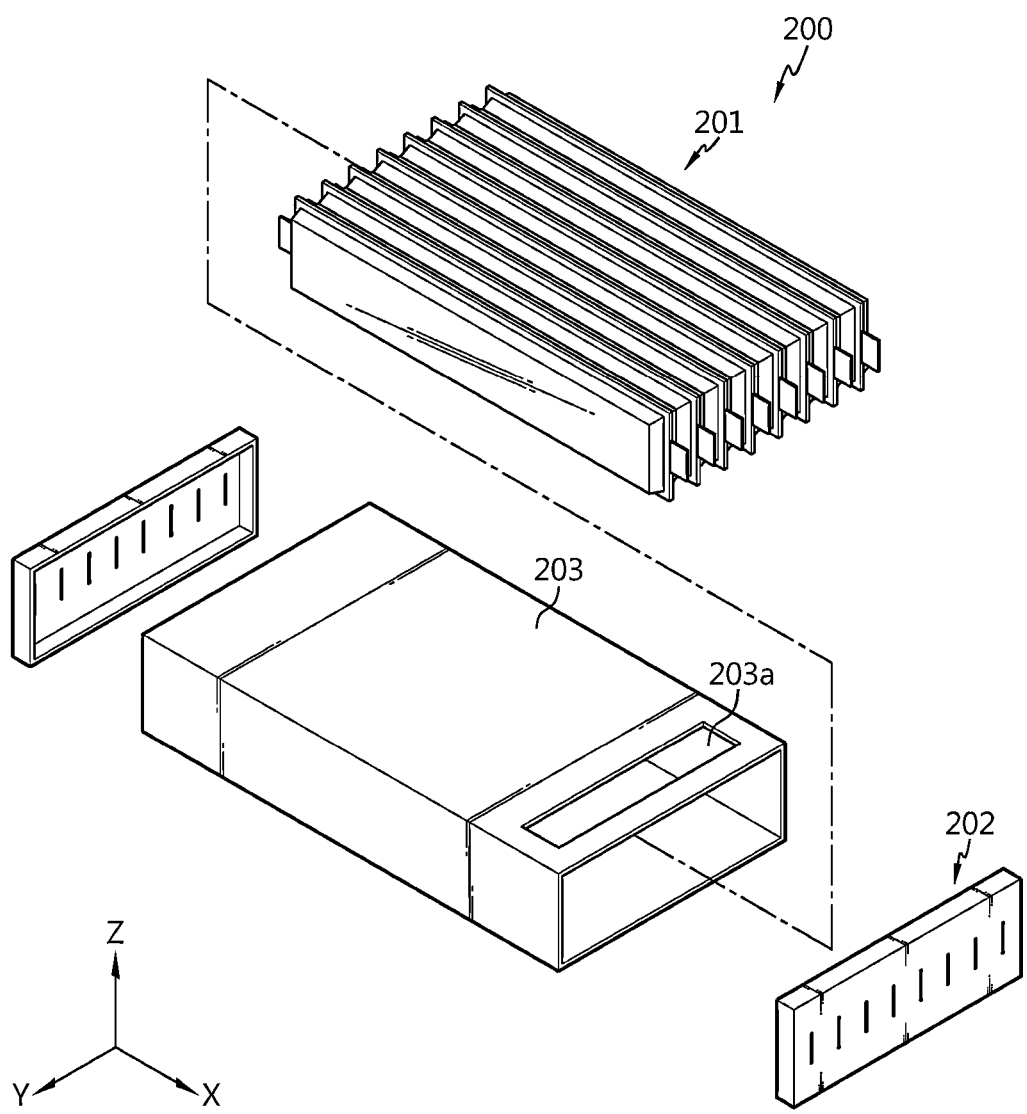

FIGS. 3 and 4 are diagrams showing a battery module included in the battery pack according to the present disclosure.

Referring to FIG. 3, the battery module 200 may include a battery cell 201. The battery cell 201 may be provided in plurality. The battery cell 201 may mean a secondary battery. The battery cell 201 may include an electrode assembly, an electrolyte, a battery case accommodating the electrode assembly and the electrolyte, and a pair of electrode leads connected to the electrode assembly and drawn out of the battery case. The battery cell 201 may be, for example, a pouch-type secondary battery. However, other types of secondary batteries, such as a cylindrical battery or prismatic battery, may also be employed as the battery cell 201 of the present disclosure.

When the battery cell 201 is provided in plurality, the plurality of battery cells 201 may be electrically connected. The battery module 200 may further include a bus bar frame assembly 202 for electrically connecting the plurality of battery cells 201 to each other. The bus bar frame assembly 202 may be provided in a pair, for example. In this case, the pair of bus bar frame assemblies 202 may be coupled to one side and the other side of the longitudinal direction (direction parallel to the X-axis) of the battery cell 201, respectively.

Referring to FIG. 4, the battery module 200 may further include a module case 203. The module case 203 may be configured to accommodate at least one battery cell 201. The module case 203 may include a venting hole 203a. When a venting gas is generated from the battery cell 201 accommodated in the inner space, the venting hole 203a may be configured to discharge the generated venting gas from the inside of the module case 203 to the outside.

Figure 5:
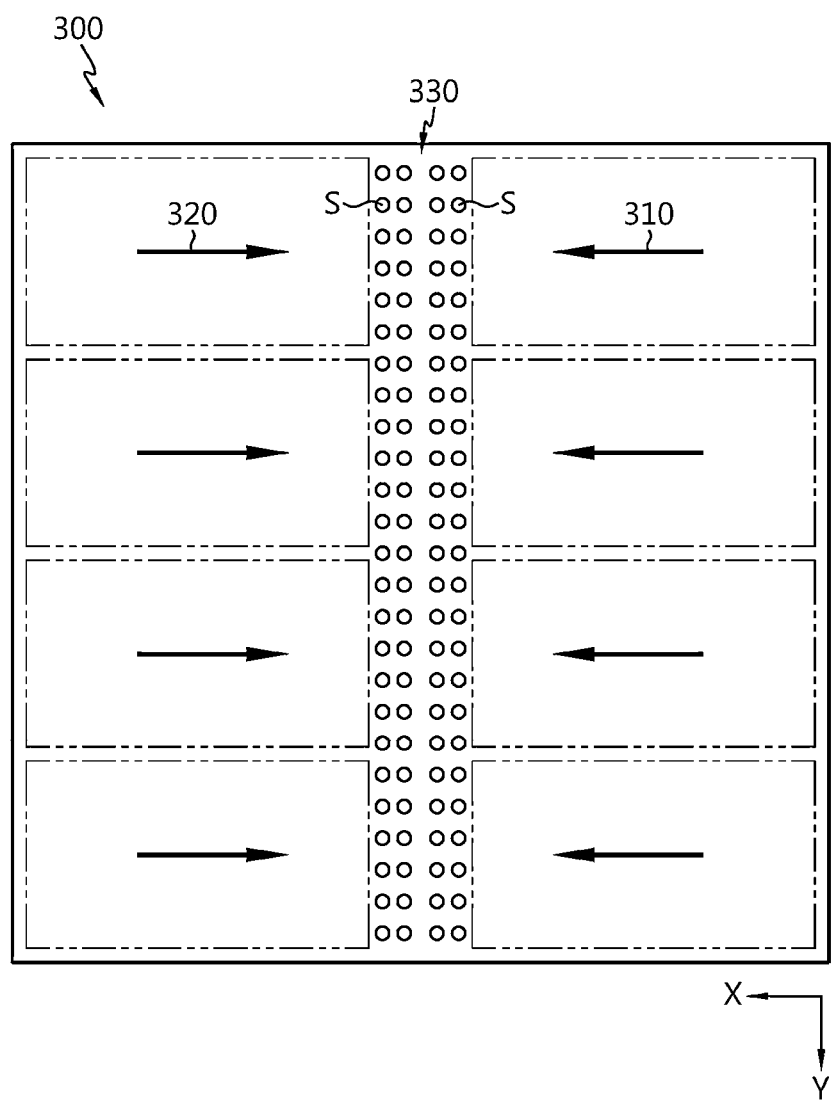
FIG. 5 is a diagram showing a moving path of a venting gas by a pack cover included in the battery pack according to the present disclosure.

FIG. 5 is a diagram showing a moving path of a venting gas by a pack cover included in the battery pack according to the present disclosure.

Referring to FIG. 5, the pack cover 300 may include a first side venting channel 310 and a second side venting channel 320.

The first side venting channel 310 may be configured to guide a venting gas generated in the plurality of battery modules 200 included in the first battery module group 210 to the collection space 130.

The second side venting channel 320 may be configured to guide a venting gas generated in the plurality of battery modules 200 included in the second battery module group 220 to the collection space 130.

The pack cover 300 may be coupled with the pack housing 100 to form a venting channel between the upper part of the battery module 200 and the inner surface of the pack cover 300.

The pack cover 300 may include a protrusion unit 330.

The protrusion unit 330 may be provided on a surface of a region corresponding to the collection space 130. The protrusion unit 330 may be configured to protrude from the surface toward the collection space 130.

According to this configuration of the present disclosure, it is possible to add a function of controlling the flow of a venting gas by creating a venting channel in the pack cover 300, which is used only for covering the pack housing 100 in a general case. Specifically, according to this configuration of the present disclosure, when a thermal event occurs in each battery module 200, the flame and venting gas may move to the collection space 130 along the first side venting channel 310 and the second side venting channel 320 formed between the upper part of the battery module 200 and the inner surface of the pack cover 300, whereby the possibility of a thermal event spreading toward adjacent battery modules 200 may be significantly reduced. When the venting gas moves to the collection space 130, the protrusion unit 330 prevents the venting gas from moving along the shortest straight path. Thus, the temperature of the venting gas may drop during movement of the venting gas, and even when a flame is generated together with the venting gas, the intensity of the flame may be weakened while moving along the venting channel. Accordingly, it is possible to remove or reduce damage that may occur due to the ejection of high-temperature venting gas and flame to the outside.

Referring back to FIG. 5, the protrusion unit 330 may include a plurality of protrusions S.

The plurality of protrusions S may be formed to be spaced apart from each other. The plurality of protrusions S may be provided along the extension direction (positive Y-axis direction) of the collection space 130. The plurality of protrusions S may be provided along a direction (X-axis extension direction) substantially perpendicular to the extension direction (positive Y-axis direction) of the collection space 130. Referring to FIG. 5 together with FIG. 1, the plurality of protrusions S may be provided in a region adjacent to the boundary of the first accommodation space 110 and the collection space 130 and a region adjacent to the boundary of the second accommodation space 120 and the collection space 130, respectively. For example, the plurality of protrusions S may be provided in two rows along the extension direction (positive Y-axis direction) of the collection space 130 in a region adjacent to the boundary of the first accommodation space 110 and the collection space 130 and a region adjacent to the boundary of the second accommodation space 120 and the collection space 130, respectively.

According to this configuration of the present disclosure, when the venting gas moves to the collection space 130 through the first side venting channel 310 and the second side venting channel 320, the venting gas directly encounters the plurality of protrusions S. Therefore, the moving path of the venting gas may be effectively increased.

Figure 6:
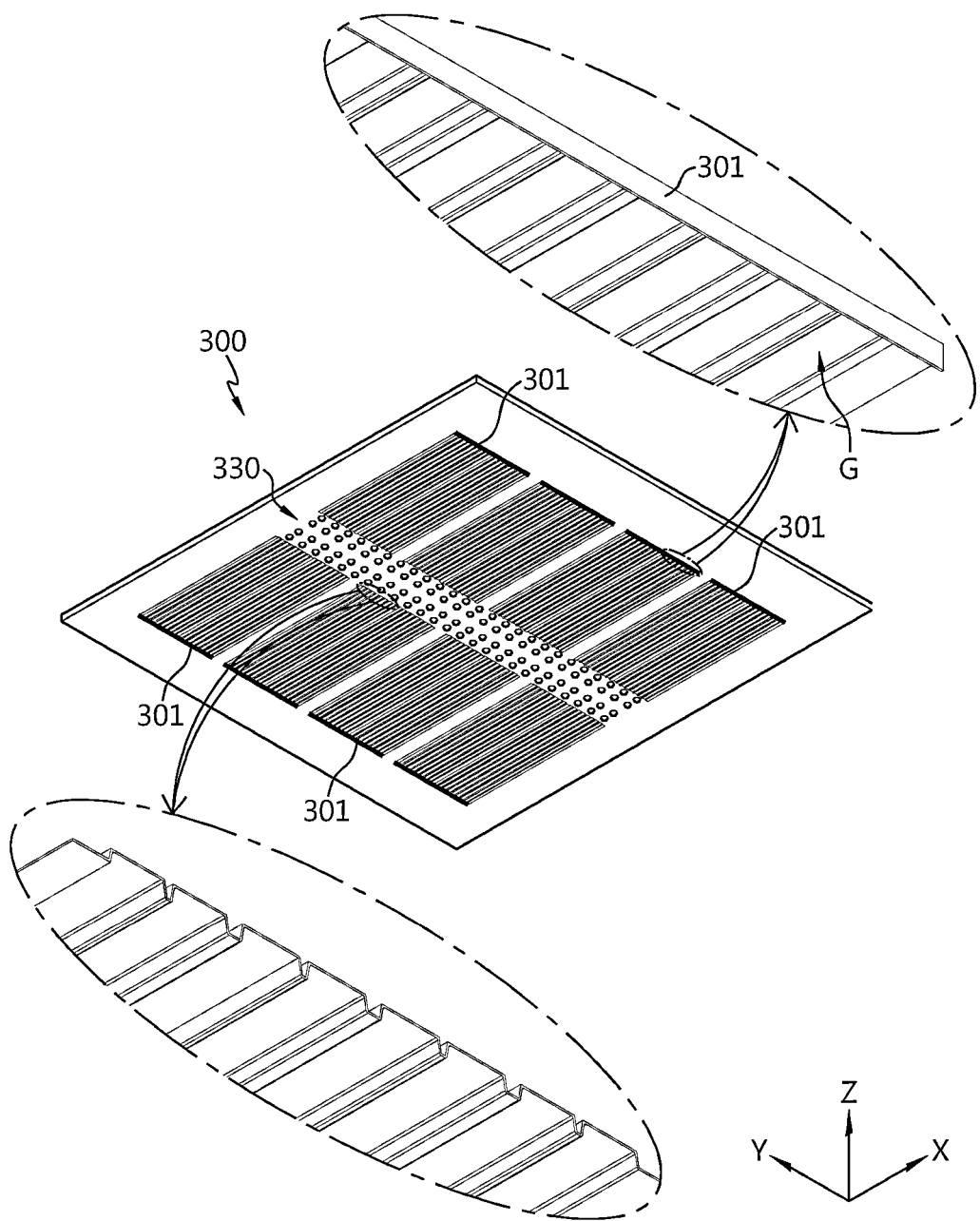
FIG. 6 is a diagram showing a pack cover included in the battery pack according to the present disclosure.

FIG. 6 is a diagram showing a pack cover included in the battery pack according to the present disclosure.

Referring to FIG. 6 together with FIG. 5, the pack cover 300 may include a first side venting channel 310 and a second side venting channel 320 formed in a groove G shape on the inner surface. The first side venting channel 310 may be provided in plurality along a direction (positive of Y-axis direction) substantially perpendicular to the extension direction (positive X-axis direction) of the first side venting channel 310. The second side venting channels 320 may be provided in plurality along a direction (positive Y-axis direction) substantially perpendicular to the extension direction (negative X-axis direction) of the second side venting channel 320. To this end, a plurality of grooves G may be provided. The pack cover 300 may include a shield 301 configured to block a venting gas from directly moving to the outside through the first side venting channel 310 and the second side venting channel 320 without passing through the collection space 130.

Figure 7:
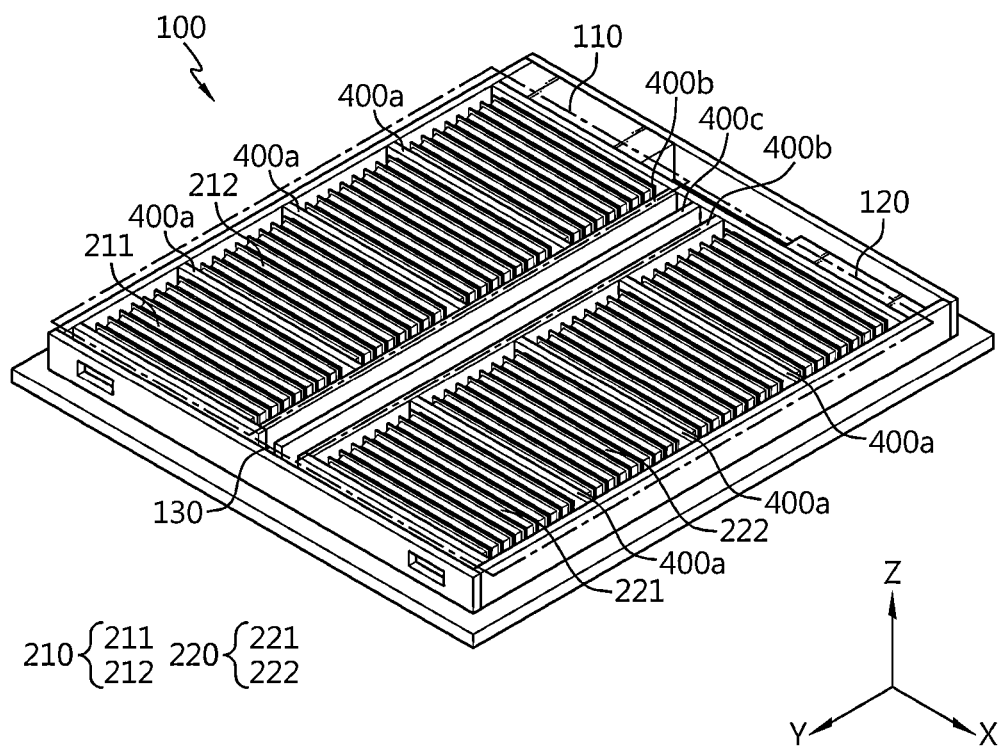
FIG. 7 is a diagram showing a barrier of the battery pack according to the present disclosure.

FIG. 7 is a diagram showing a barrier of the battery pack according to the present disclosure.

Referring to FIG. 7, the first battery module group 210 may include a first battery module 211 and a second battery module 212 adjacent to each other. The second battery module group 220 may include a third battery module 221 and a fourth battery module 222 adjacent to each other.

In the present disclosure, the first battery module 211 and the second battery module 212 do not refer to specific battery modules. That is, the first battery module 211 and the second battery module 212 refer to one and the other of a pair of battery modules randomly selected in the first battery module group 210 and adjacent to each other. The third battery module 221 and the fourth battery module 222 do not refer to specific battery modules. That is, the third battery module 221 and the fourth battery module 222 refer to one and the other of a pair of battery modules randomly selected in the second battery module group 220 and adjacent to each other.

The battery pack 10 may include a first barrier 400a and/or an additional barrier 400b and/or a third barrier 400c.

The first barrier 400a may be disposed at a corresponding position between the first battery module 211 and the second battery module 212 and at a corresponding position between the third battery module 221 and the fourth battery module 222. The first barrier 400a may be configured to block the movement of a venting gas between the accommodation space of the first battery module 211 and the accommodation space of the second battery module 212 and the movement of a venting gas between the accommodation space of the third battery module 221 and the accommodation space of the fourth battery module 222. The first barrier 400a may be coupled with the pack cover 300 and/or the pack housing 100. The coupling may be performed by welding, bolting, or the like. The first barrier 400a may have an approximate beam shape with an empty inside.

However, as described above, since the first battery module 211, the second battery module 212, the third battery module 221, and the fourth battery module 222 do not refer to specific battery modules, the first barrier 400a may be disposed at a corresponding position between the plurality of batteries battery modules 200 in the first battery module group 210 and a corresponding position between the plurality of battery modules 200 included in the second battery module group 220.

According to this configuration of the present disclosure, the accommodation spaces of battery modules adjacent to each other are structurally isolated from each other by the first barrier 400a, so that the venting gas generated in each battery module does not move toward an adjacent battery module but moves through the first side venting channel 310 and the second side venting channel 320. The venting gas moved in this way moves through the collection space 130 again. During this movement, the temperature of the venting gas may be lowered and the intensity of the flame may be weakened. When the first barrier 400a has an approximate beam shape with an empty inner space, the weight of the battery pack 10 may be reduced in addition to improving the rigidity of the battery pack 10 and blocking the movement of a venting gas between adjacent accommodation spaces.

The additional barrier 400b may be disposed at a corresponding position between the first accommodation space 110 and the collection space 130 and at a corresponding position between the second accommodation space 120 and the collection space 130, respectively. The additional barrier may be configured to block the movement of a venting gas between the first accommodation space 110 and the collection space 130 and between the second accommodation space 120 and the collection space 130.

The third barrier 400c may be configured to partition the collection space 130. The third barrier 400c prevents the venting gas collected through the first side venting channel 310 and the venting gas collected through the second side venting channel 320 from mixing. That is, the third barrier 400c may be configured to prevent the venting gas generated from the first battery module group 210 from affecting the second battery module group 220. Also, the third barrier 400c may be configured to prevent the venting gas generated from the second battery module group 220 from affecting the first battery module group 210. The third barrier 400c may be coupled with the pack cover 300 and/or the pack housing 100. The coupling may be performed by welding, bolting, or the like. The third barrier 400c may have an approximate beam shape with an empty inside. The empty space formed in the third barrier 400c may be used as a passage through which wires for connecting the battery modules pass. The wiring may be protected from physical impact by the third barrier 400c.

Figure 8:
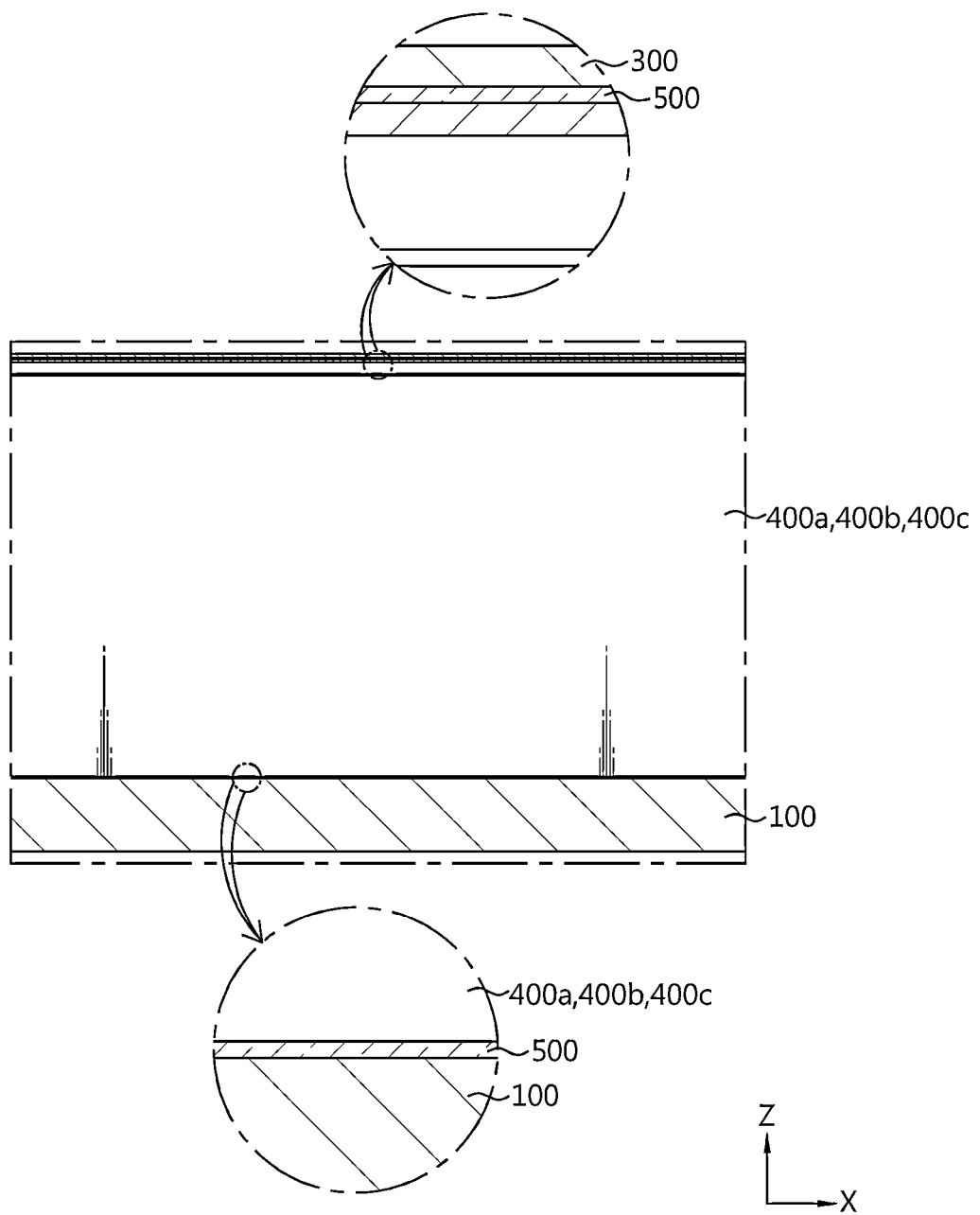
FIG. 8 is a cross-sectional view schematically showing an exemplary shape of a cross-section taken along line A-A' in FIG. 2.

FIG. 8 is a cross-sectional view schematically showing an exemplary shape of a cross-section taken along line A-A' in FIG. 2.

Referring to FIG. 8, the battery pack 10 may include a sealing member 500.

The sealing member 500 may be provided in at least one position between the first barrier 400a and the pack cover 300 and between the first barrier 400a and the pack housing 100. The sealing member 500 may be provided in at least one position between the additional barrier 400b and the pack cover 300 and between the additional barrier 400b and the pack housing 100. The sealing member 500 may be provided in at least one position between the third barrier 400c and the pack cover 300 and between the third barrier 400c and the pack housing 100. The sealing member 500 may be configured to at least partially cover the coupling portions of the pack cover 300 and/or the pack housing 100 and the barriers 400a, 400b, 400c.

According to this configuration of the present disclosure, the effect of preventing a venting gas from moving into gaps between the pack cover 300 and/or the pack housing 100 and the barriers 400a, 400b, 400c may be further improved.

Figure 9:
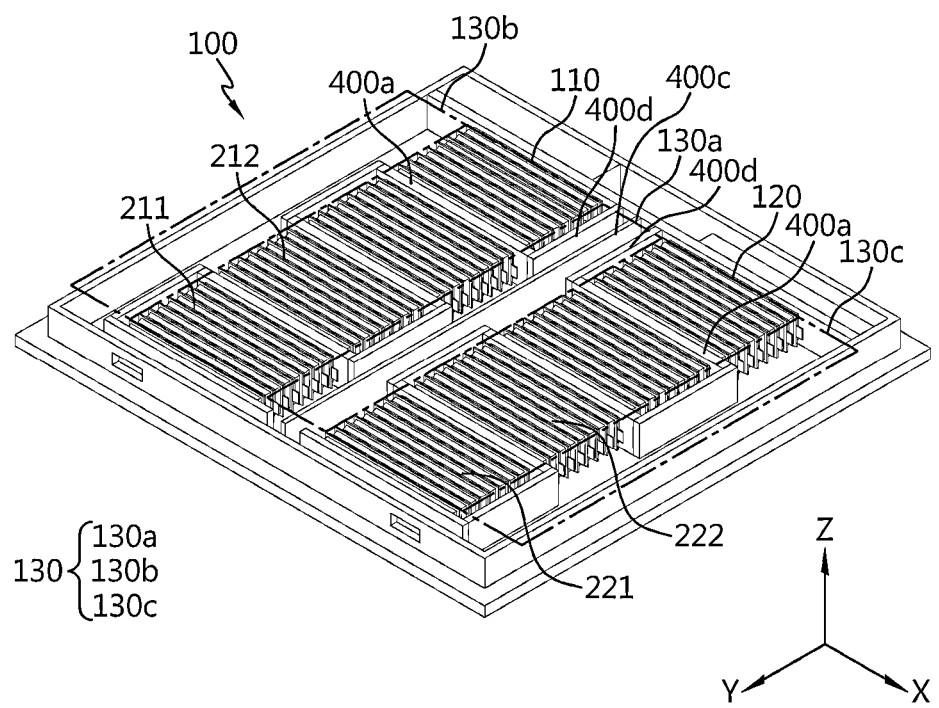
FIG. 9 is a diagram showing a pack housing included in the battery pack according to the present disclosure and a battery module accommodated in the pack housing.

FIG. 9 is a diagram showing a pack housing included in the battery pack according to the present disclosure and a battery module accommodated in the pack housing.

Referring to FIG. 9, the collection space 130 may include a first collection space 130a formed between the first accommodation space 110 and the second accommodation space 120. The collection space 130 may include a second collection space 130b formed at a side opposite to the first collection space 130a with the first accommodation space 110 interposed therebetween. The collection space 130 may include a third collection space 130c formed at a side opposite to the first collection space 130a with the second accommodation space 120 interposed therebetween.

Figure 10:
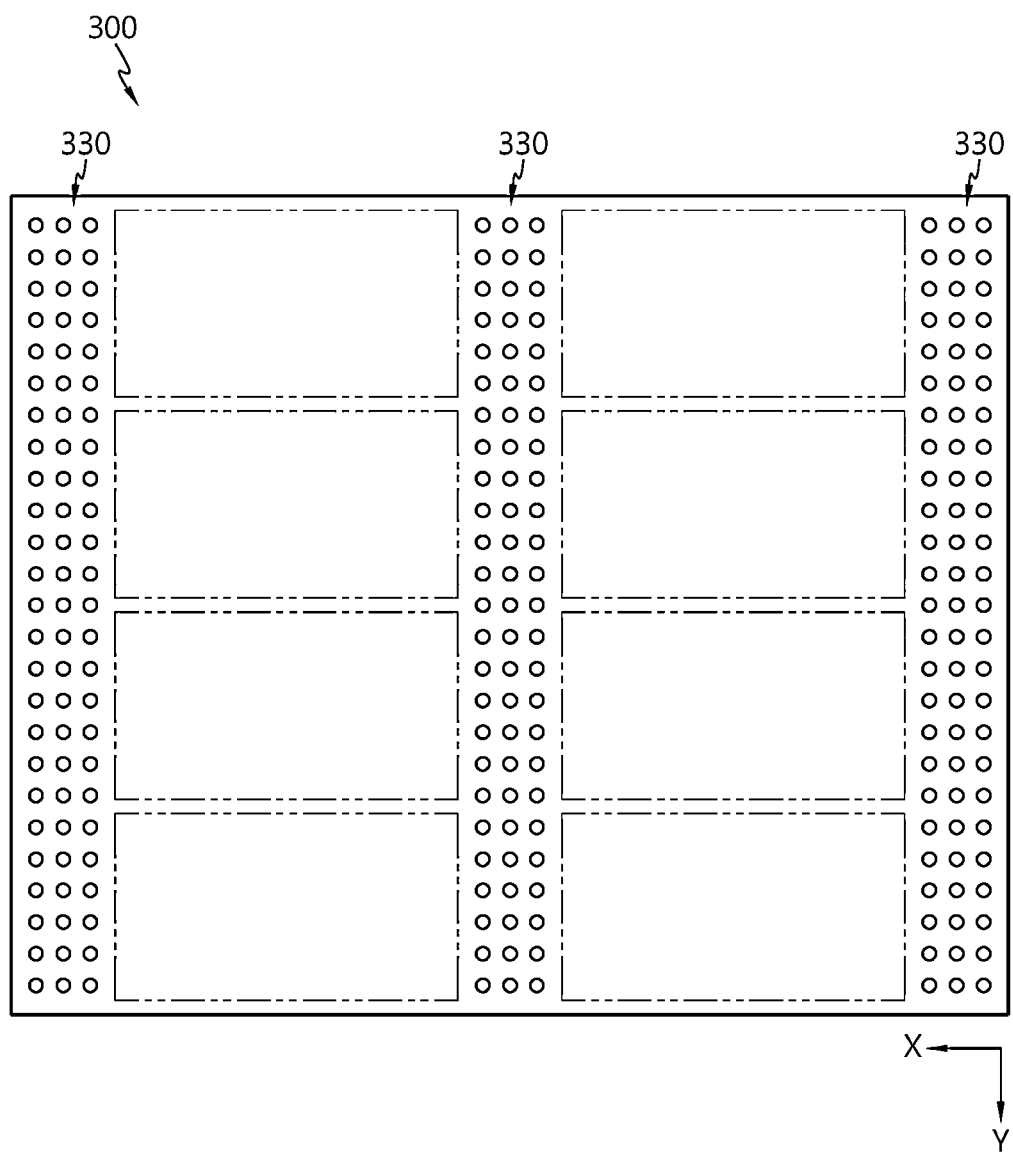
FIG. 10 is a diagram showing a pack cover included in the battery pack according to the present disclosure.

FIG. 10 is a diagram showing a pack cover included in the battery pack according to the present disclosure.

Referring to FIG. 10, the protrusion unit 330 may be provided in at least one region among a region corresponding to the first collection space 130a, a region corresponding to the second collection space 130b, and a region corresponding to the third collection space 130c. As shown in FIG. 10, the protrusion unit 330 may be provided in all of the region corresponding to the first collection space 130*a*, the region corresponding to the second collection space 130*b*, and the region corresponding to the third collection space 130*c*. Unlike this, the protrusion unit 330 may be selectively provided in a part of a region corresponding to at least one collection space 130 as in an embodiment shown below.

According to this configuration of the present disclosure, when a venting gas moves to the collection space 130, the protrusion unit 330 prevents the venting gas from moving along the shortest straight path. Therefore, by selectively providing the protrusion unit 330 in the pack cover 300 according to the venting channel provided in the pack cover 300, the traveling distance of the venting gas may be varied for each battery module. The venting gas generated from each battery module may be discharged with a time difference.

Figure 11:
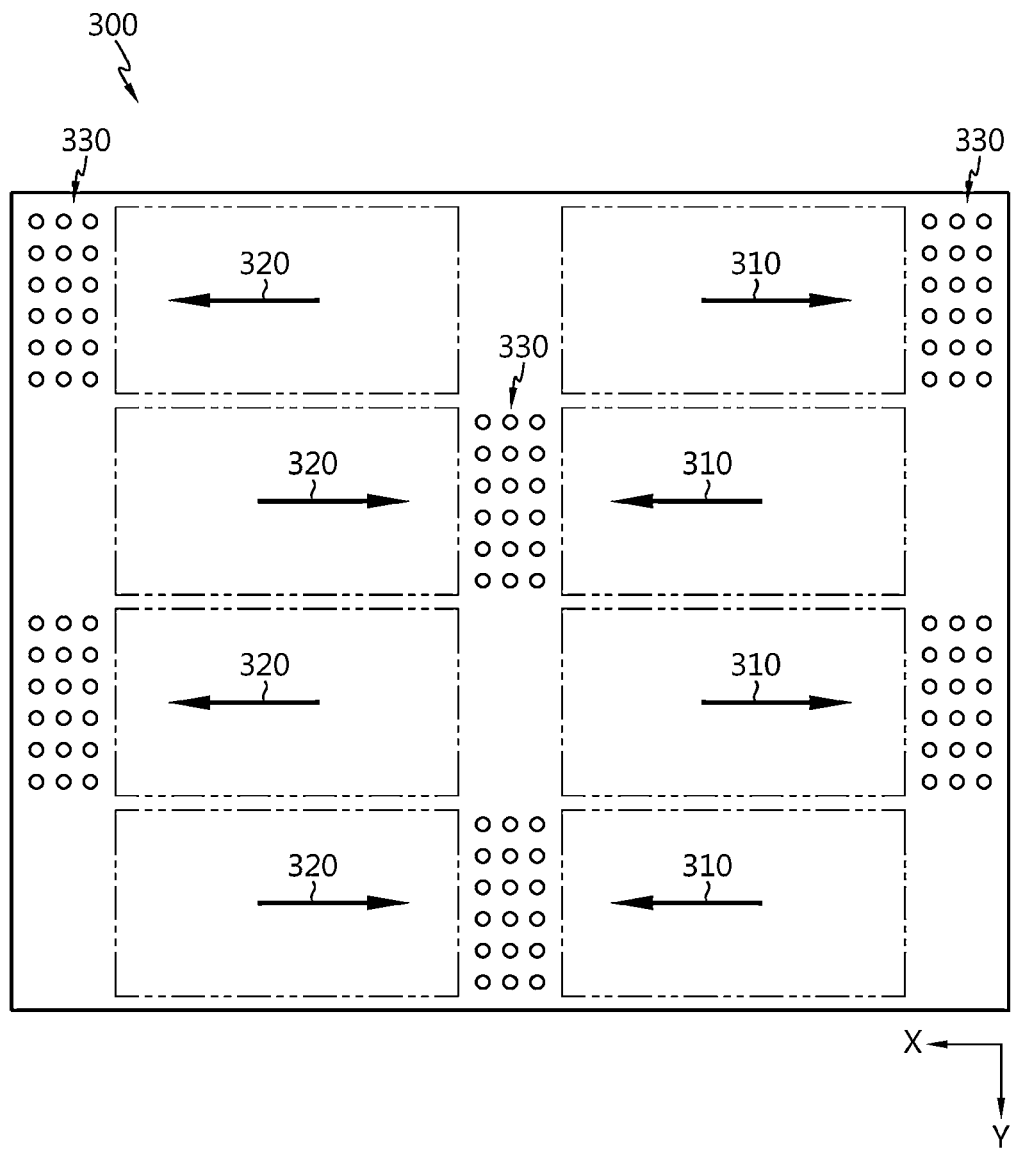
FIG. 11 is a diagram showing a moving path of a venting gas by the pack cover included in the battery pack according to the present disclosure.
Figure 12:
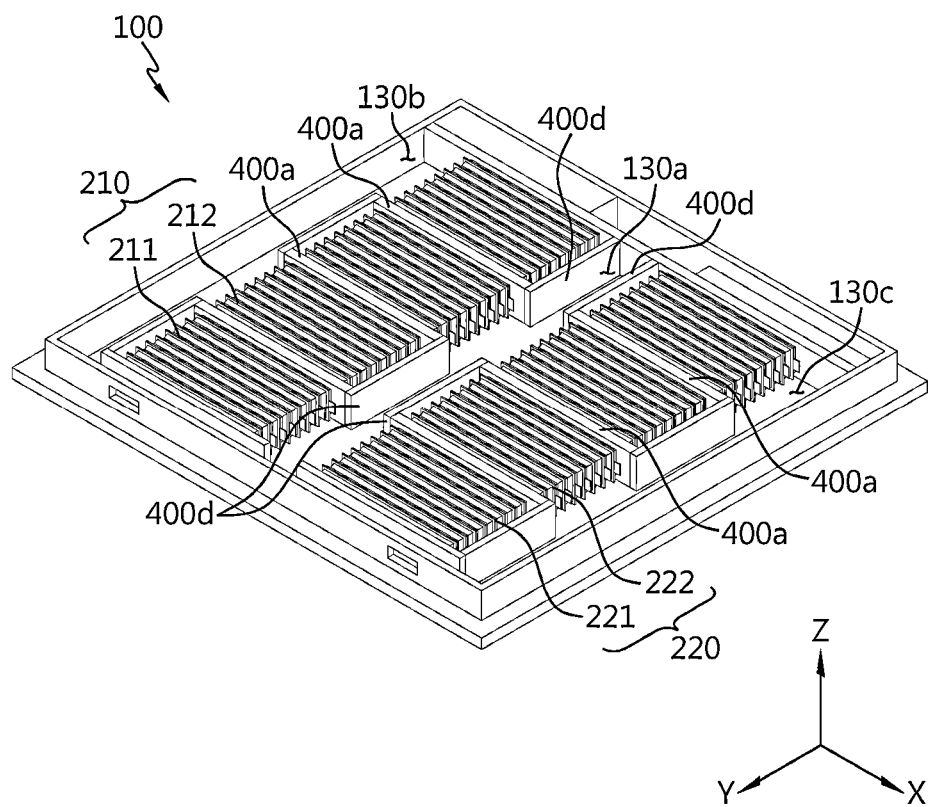
FIG. 12 is a diagram showing a pack housing included in the battery pack according to the present disclosure and a battery module accommodated in the pack housing.
Figure 13:
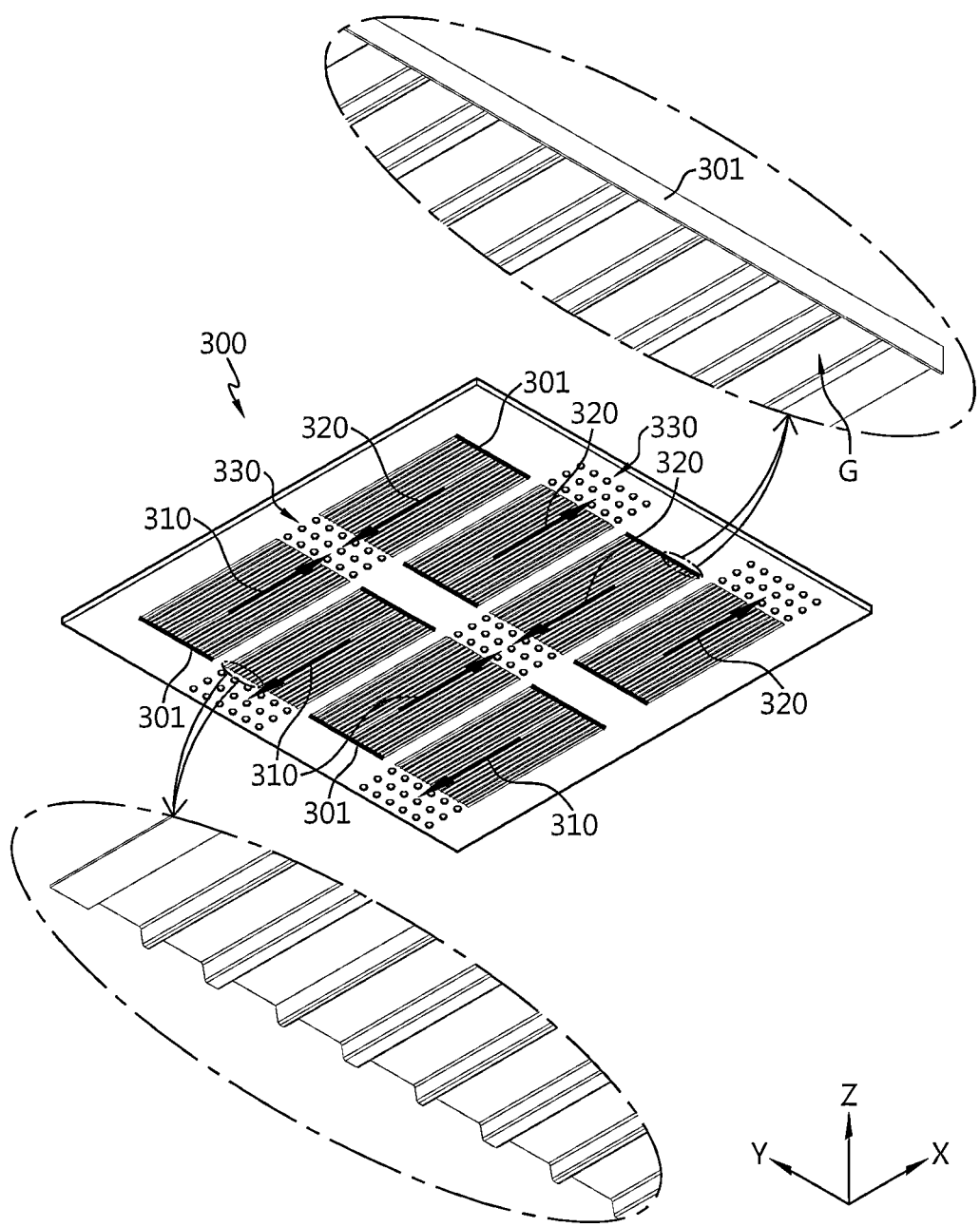
FIG. 13 is a diagram showing a pack cover included in the battery pack according to the present disclosure.
Figure 14:
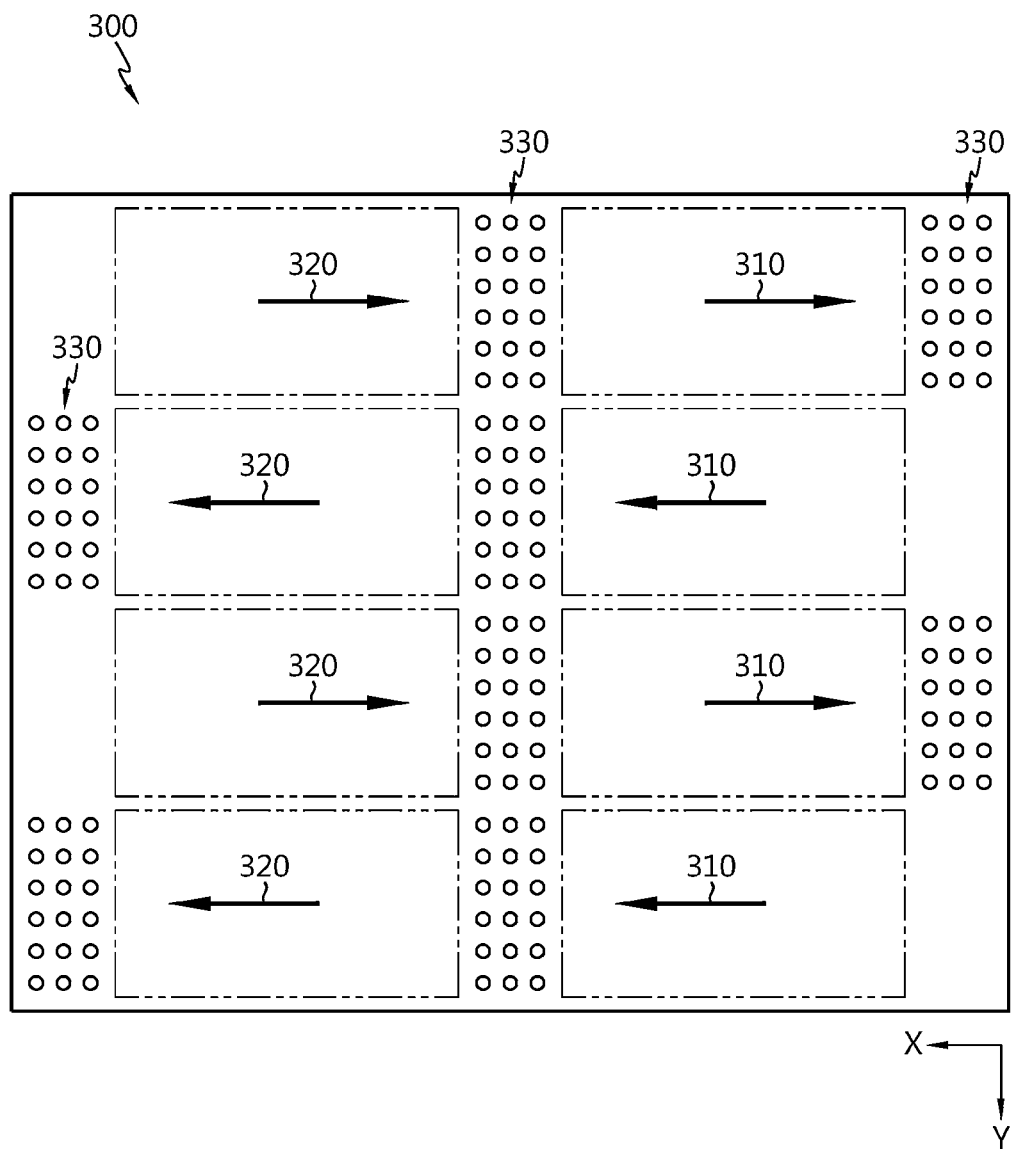
FIG. 14 is a diagram showing a moving path of a venting gas by the pack cover included in the battery pack according to the present disclosure.
Figure 15:
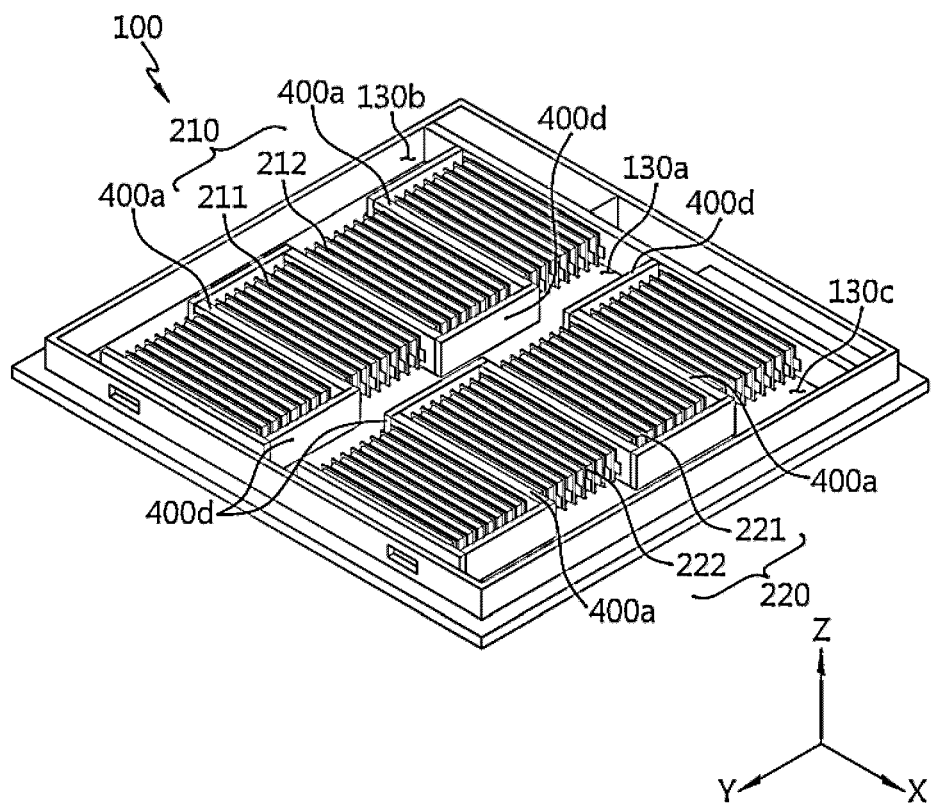
FIG. 15 is a diagram showing a pack housing included in the battery pack according to the present disclosure and a battery module accommodated in the pack housing.
Figure 16:
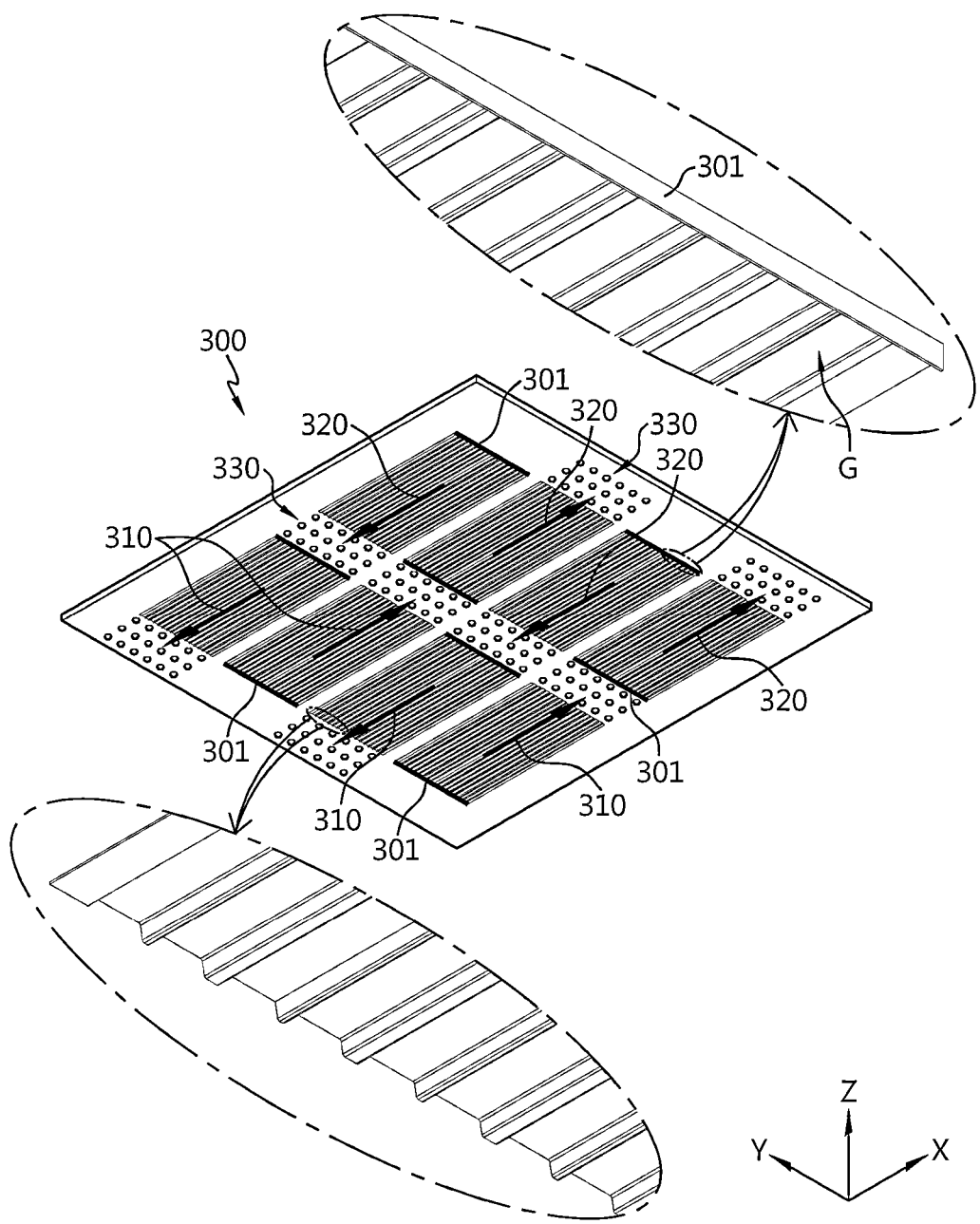
FIG. 16 is a diagram showing a pack cover included in the battery pack according to the present disclosure.

FIG. 11 is a diagram showing a moving path of a venting gas by the pack cover included in the battery pack according to the present disclosure. FIG. 12 is a diagram showing a pack housing included in the battery pack according to the present disclosure and a battery module accommodated in the pack housing. FIG. 13 is a diagram showing a pack cover included in the battery pack according to the present disclosure. FIG. 14 is a diagram showing a moving path of a venting gas by the pack cover included in the battery pack according to the present disclosure. FIG. 15 is a diagram showing a pack housing included in the battery pack according to the present disclosure and a battery module accommodated in the pack housing. FIG. 16 is a diagram showing a pack cover included in the battery pack according to the present disclosure.

Referring to FIGS. 11 to 16, the pack cover 300 may be configured to guide the venting gas generated from the first battery module 211 to the first collection space 130*a*, guide the venting gas generated from the second battery module 212 to the second collection space 130*b*, guide the venting gas generated from the third battery module 221 to the first collection space 130*a*, and guide the venting gas generated from the fourth battery module 222 to the third collection space 130*c*.

However, as described above, the first battery module 211 and the second battery module 212 do not refer to specific battery modules, but refer to a pair of battery modules 200 randomly selected from the first battery module group 210 and adjacent to each other. This is also the same for the third battery module 221 and the fourth battery module 222.

Referring to FIG. 12, the first battery module 211 and the third battery module 221 may face each other, and the second battery module 212 and the fourth battery module 222 may face each other.

Referring to FIG. 15, the first battery module 211 and the fourth battery module 222 may face each other, and the second battery module 212 and the third battery module 221 may face each other.

Referring to FIGS. 12 and 15 together with FIG. 9, the battery pack 10 may include a second barrier 400*d* as well as the first barrier 400*a* and/or the third barrier 400*c* described above.

Referring to FIG. 12, in the inner space of the pack housing 100 of the battery pack 10, the second barrier 400*d* may be disposed at corresponding positions between the accommodation space accommodating the first battery module 211 and the second collection space 130*b*, between the accommodation space accommodating the second battery module 212 and the first collection space 130*a*, between the accommodation space accommodating the third battery module 221 and the third collection space 130*c*, and between the accommodation space accommodating the fourth battery module 222 and the first collection space 130*a*, respectively.

Referring to FIG. 15, in the inner space of the pack housing 100, the second barrier 400*d* may be disposed at corresponding positions between the accommodation space accommodating the first battery module 211 and the second collection space 130*b*, between the accommodation space of accommodating the second battery module 212 and the first collection space 130*a*, between the accommodation space accommodating the third battery module 221 and the first collection space 130*a*, and between the accommodation space accommodating the fourth battery module 222 and the third collection space 130*c*, respectively.

Referring to FIGS. 13 and 16, similarly to the above description, the pack cover 300 may include a first side venting channel 310 and a second side venting channel 320 formed in a groove G shape on the inner surface. The first side venting channel 310 may be provided in plurality along a direction (Y-axis extension direction) substantially perpendicular to the extension direction (X-axis extension direction) of the first side venting channel 310. The second side venting channel 320 may be provided in plurality along a direction (Y-axis extension direction) substantially perpendicular to the extension direction (X-axis extension direction) of the second side venting channel 320. To this end, the groove G may be provided in plurality.

Referring back to FIGS. 13 and 16, similarly to the above description, the pack cover 300 may include a shield 301. The shield 301 may be provided in a boundary region between a region corresponding to the first collection space 130*a* and the first side venting channel 310. In this case, the communication between the first side venting channel 310 and the first collection space 130*a* may be blocked. The shield 301 may be provided in a boundary region between a region corresponding to the second collection space 130*b* and the first side venting channel 310. In this case, the communication between the first side venting channel 310 and the second collection space 130*b* may be blocked. The shield 301 may be provided in a boundary region between a region corresponding to the first collection space 130*a* and the second side venting channel 320. In this case, the communication between the second side venting channel 320 and the first collection space 130*a* may be blocked. The shield 301 may be provided in a boundary region between a region corresponding to the third collection space 130*c* and the second side venting channel 320. In this case, the communication between the second side venting channel 320 and the third collection space 130*c* may be blocked.

According to this configuration of the present disclosure, the battery modules adjacent to each other in the first battery module group 210 may configure different venting channels. The battery modules adjacent to each other in the second battery module group 220 may configure different venting channels. The effect of high-temperature flame and venting gas generated from adjacent battery modules on other battery modules can be minimized. Depending on the size of the battery pack 10 and the arrangement of battery modules, an effective venting channel may be configured.

Figure 17:
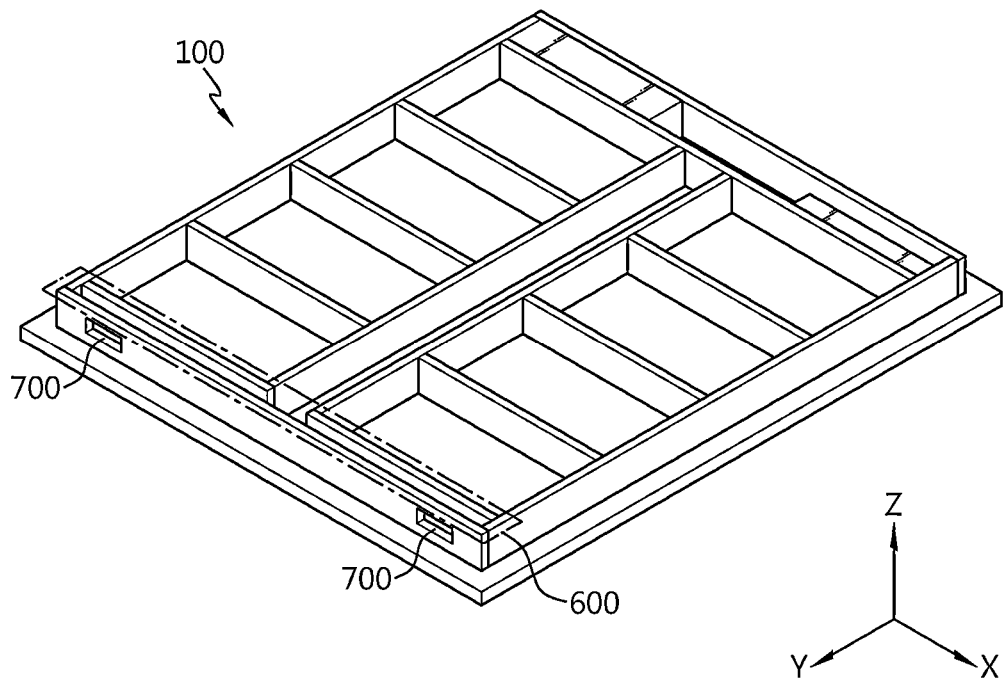
FIG. 17 is a diagram showing a collection space and a venting device included in the battery pack according to the present disclosure.

FIG. 17 is a diagram showing a gas collection space and a venting device included in the battery pack according to the present disclosure.

Referring to FIG. 17, the battery pack 10 may include a gas collection space 600 and/or a venting device 700.

The gas collection space 600 may be provided to at least one of one side and the other side of the pack housing 100. The venting gas generated in each battery module moves through the first side venting channel 310 and the second side venting channel 320 and is collected in the gas collection space 600. For example, the gas collection space 600 may be provided at an end of the pack housing 100 in the longitudinal direction (positive Y-axis direction). However, the present disclosure is not limited to the shape, location, and number of the gas collection space 600 shown in FIG. 17.

The venting device 700 may be configured to discharge the venting gas in the gas collection space 600 to the outside of the pack housing 100. The venting device 700 is formed to penetrate the pack housing 100 and may be in the form of a simple hole. In addition, the venting device 700 may be a specific device that not only has a completely open form, but also has a form not completely open, but is closed in a normal state and may be opened according to a change in pressure or temperature. The venting device 700 may be, for example, a one-way valve.

According to this configuration of the present disclosure, when the internal pressure of the battery pack 10 increases since a large amount of gas is generated at once, the internal pressure of the battery pack 10 may be quickly reduced through the gas collection space 600. The gas may be discharged in the intended direction through the venting device 700, and even if a lot of venting gas is instantaneously generated, the gas may be discharged more rapidly and smoothly by increasing the processing capacity or number of the venting device 700.

Figure 18:
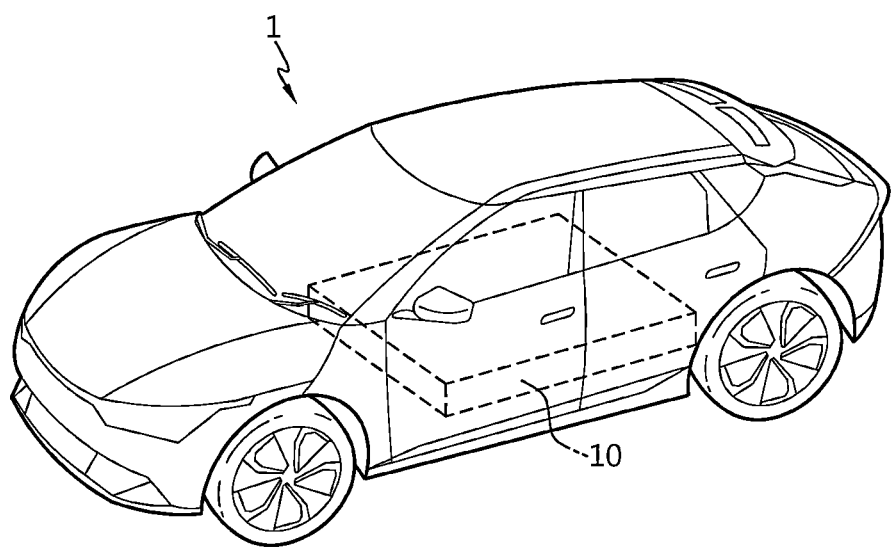
FIG. 18 is a diagram showing a vehicle according to the present disclosure.

FIG. 18 is a diagram showing a vehicle according to the present disclosure.

Referring to FIG. 18, the battery pack 10 may be applied to a vehicle 1 such as an electric vehicle 1 or a hybrid vehicle 1. That is, the vehicle 1 according to the present disclosure may include the battery pack 10 according to the present disclosure. In addition, the vehicle 1 according to the present disclosure may further include various other components included in a vehicle 1 in addition to the battery pack 10. For example, the vehicle 1 according to the present disclosure may further include a vehicle body, a motor, and a control device such as an electronic control unit (ECU), in addition to the battery pack 10 according to the present disclosure.

As described above, the present disclosure has been described based on preferred embodiments with reference to the accompanying drawings, but it is clear that many various and obvious modifications can be made from this description to those skilled in the art without departing from the scope of the present disclosure. Accordingly, the scope of the present disclosure should be construed by the claims described to include such many modified examples.

EXPLANATION OF REFERENCE SIGNS

1: vehicle
10: battery pack
100: pack housing
110: first accommodation space
120: second accommodation space
130: collection space
130a: first collection space
130b: second collection space
130c: third collection space
200: battery module
201: battery cell
202: bus bar frame assembly
203: module case
203a: venting hole
210: first battery module group
211: first battery module
212: second battery module
220: second battery module group
221: third battery module
222: fourth battery module
300: pack cover
301: shield
310: first side venting channel
320: second side venting channel
330: protrusion unit
400a: first barrier
400b: additional barrier
400c: third barrier
400d: second barrier
500: sealing member
600: gas collection space
700: venting device
S: plurality of protrusions
G: groove

What is claimed is:

1. A battery pack comprising:
a pack housing having barriers extend upwardly from a bottom wall to form a first accommodation space, a second accommodation space spaced apart from the first accommodation space, and a collection space;
a first battery module group including a plurality of battery modules disposed within the first accommodation space;
a second battery module group including a plurality of battery modules disposed within the second accommodation space; and
a pack cover including a first side venting channel formed in a bottom surface of the pack cover and configured to guide a venting gas generated in the plurality of battery modules included in the first battery module group to the collection space and a second side venting channel formed in the bottom surface of the pack cover and configured to guide a venting gas generated in the plurality of battery modules included in the second battery module group to the collection space,
wherein the pack cover includes a protrusion unit on a surface of a region corresponding to the collection space.

2. The battery pack according to claim 1, wherein the protrusion unit includes a plurality of protrusions configured to protrude from the surface toward the collection space.

3. The battery pack according to claim 2, wherein the plurality of protrusions are spaced apart from each other.

4. The battery pack according to claim 3, wherein the plurality of protrusions are provided along an extension direction of the collection space.

5. The battery pack according to claim 3, wherein the plurality of protrusions are provided along a direction perpendicular to an extension direction of the collection space.

6. The battery pack according to claim 3, wherein the plurality of protrusions are provided in a region adjacent to a boundary between the first accommodation space and the collection space and a region adjacent to a boundary between the second accommodation space and the collection space.

7. The battery pack according to claim 1, wherein the first battery module group includes a first battery module and a second battery module adjacent to each other, and the second battery module group includes a third battery module and a fourth battery module adjacent to each other, and
wherein the barriers include a first barrier disposed at a corresponding position between the first battery module and the second battery module and at a corresponding position between the third battery module and the fourth battery module.

8. The battery pack according to claim 7, wherein the first barrier is configured to block the movement of a venting gas between a first space within the first accommodation space retaining the first battery module and a second space within the first accommodation space retaining the second battery module, and the movement of a venting gas between a third space within the second accommodation space retaining the third battery module and a fourth space within the second accommodation space retaining the fourth battery module.

9. The battery pack according to claim 8, wherein the battery pack includes a sealing member at least one position between the first barrier and the pack cover and between the first barrier and the pack housing.

10. The battery pack according to claim 1, wherein the collection space includes a first collection space formed between the first accommodation space and the second accommodation space.

11. The battery pack according to claim 10, wherein the collection space includes:
a second collection space formed at a side opposite to the first collection space with the first accommodation space interposed therebetween; and
a third collection space formed at a side opposite to the first collection space with the second accommodation space interposed therebetween.

12. The battery pack according to claim 11, wherein the protrusion unit is provided in at least one region among a region corresponding to the first collection space, a region corresponding to the second collection space, and a region corresponding to the third collection space.

13. The battery pack according to claim 11, wherein the first battery module group includes a first battery module and a second battery module adjacent to each other, and the second battery module group includes a third battery module and a fourth battery module adjacent to each other, and
wherein the pack cover is configured to:
guide a venting gas generated in the first battery module to the first collection space and guide a venting gas generated in the second battery module to the second collection space, and
guide a venting gas generated in the third battery module to the first collection space and guide a venting gas generated in the fourth battery module to the third collection space.

14. The battery pack according to claim 13, wherein the first battery module and the third battery module face each other, and the second battery module and the fourth battery module face each other.

15. The battery pack according to claim 14, wherein the barriers include a second barrier at corresponding positions between an accommodation space accommodating the first battery module and the second collection space, between an accommodation space accommodating the second battery module and the first collection space, between an accommodation space accommodating the third battery module and the third collection space, and between an accommodation space accommodating the fourth battery module and the first collection space.

16. The battery pack according to claim 13, wherein the first battery module and the fourth battery module face each other, and the second battery module and the third battery module face each other.

17. The battery pack according to claim 16, wherein the barriers include a second barrier disposed between a first space within the first accommodation space retaining the first battery module and the second collection space, between a second space within the first accommodation space retaining the second battery module and the first collection space, between a third space within the second accommodation space retaining the third battery module and the third collection space, and between a fourth space within the first accommodation space retaining the fourth battery module and the first collection space.

18. The battery pack according to claim 1, wherein the pack housing has a gas collection space formed in a first side.

19. The battery pack according to claim 18, wherein the pack housing includes a venting device configured to allow the venting gas in the gas collection space to be discharged to the outside of the pack housing.

20. A vehicle, comprising the battery pack according to claim 1.

* * * * *